(12) United States Patent
Karri et al.

(10) Patent No.: US 11,741,489 B2
(45) Date of Patent: Aug. 29, 2023

(54) AI ENABLED COUPON CODE GENERATION FOR IMPROVED USER EXPERIENCE

(71) Applicant: INTERNATIONAL BUSINESS MACHINES CORPORATION, Armonk, NY (US)

(72) Inventors: Venkata Vara Prasad Karri, Visakhapatnam (IN); Hemant Kumar Sivaswamy, Pune (IN); Shikhar Kwatra, San Jose, CA (US); Naga Srinivasa Reddy Padala, Vishakapatname (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/399,347

(22) Filed: Aug. 11, 2021

(65) Prior Publication Data

US 2023/0046213 A1    Feb. 16, 2023

(51) Int. Cl.
*G06Q 30/00* (2023.01)
*G06Q 30/0207* (2023.01)
*G06T 11/00* (2006.01)

(52) U.S. Cl.
CPC ..... *G06Q 30/0224* (2013.01); *G06Q 30/0239* (2013.01); *G06T 11/00* (2013.01)

(58) Field of Classification Search
CPC . G06Q 30/0224; G06Q 30/0239; G06T 11/00
See application file for complete search history.

(56) References Cited

U.S. PATENT DOCUMENTS 8,825,523 B2    9/2014   Gillenson
10,210,537 B2   2/2019   Steinart
(Continued)

FOREIGN PATENT DOCUMENTS

AU    2020100702 A4    6/2020
CN    109658130 A      4/2019

OTHER PUBLICATIONS

Guedes, "Machine Learning in Coupon Recommendation", May 27, 2020, 11 pages.
(Continued)

*Primary Examiner* — Meredith A Long
(74) *Attorney, Agent, or Firm* — Robert R. Aragona

(57) ABSTRACT

An embodiment for generating an electronic coupon based on user preferences is provided. The embodiment may include receiving real-time and historical data relating to one or more reward coupons. The embodiment may also include identifying a contextual situation of the user and one or more preferences of the user regarding a coupon reward type. The embodiment may further include identifying one or more vendors that match with the one or more preferences of the user. The embodiment may also include generating one or more electronic coupons and presenting the one or more generated electronic coupons to the user. The embodiment may further include in response to determining the one or more generated electronic coupons match at least one preference of the user, adding the one or more generated electronic coupons that match the at least one preference of the user to an account of the user.

17 Claims, 7 Drawing Sheets

(56) References Cited

U.S. PATENT DOCUMENTS

| | | | |
|---|---|---|---|
| 2010/0191598 A1* | 7/2010 | Toennis | G06Q 30/0269 |
| | | | 705/14.66 |
| 2014/0155091 A1* | 6/2014 | Oliveira | G06Q 10/10 |
| | | | 455/456.2 |
| 2014/0172524 A1 | 6/2014 | Saura | |
| 2014/0180793 A1 | 6/2014 | Boal | |
| 2014/0180810 A1* | 6/2014 | Boal | G06Q 20/209 |
| | | | 705/14.53 |
| 2014/0195314 A1 | 7/2014 | Ariff | |
| 2014/0365295 A1 | 12/2014 | Postrel | |
| 2018/0083859 A1* | 3/2018 | Barnum | H04L 69/24 |
| 2018/0121968 A1* | 5/2018 | LaMontagne | G06Q 30/0277 |
| 2019/0108686 A1* | 4/2019 | Spivack | G06Q 30/0277 |
| 2019/0213626 A1* | 7/2019 | Khoyilar | G06F 16/144 |
| 2020/0226632 A1 | 7/2020 | Khan | |
| 2021/0004858 A1* | 1/2021 | Arora | G06Q 30/0225 |
| 2021/0287202 A1* | 9/2021 | Fowler | G06Q 20/3276 |
| 2022/0398401 A1* | 12/2022 | Marzorati | G06V 20/20 |

OTHER PUBLICATIONS

Mell et al., "The NIST Definition of Cloud Computing", Recommendations of the National Institute of Standards and Technology, NIST Special Publication 800-145, Sep. 2011, 7 pages.

Schmitt, "Use AI to Predict Who to Target Offers At", Data Revenue, 2020, 5 Pages.

Yao, "Optimizing Digital Coupon Assignment Using Constrained Reinforcement Learning", Jan. 25-28, 2019, 5 pages.

* cited by examiner

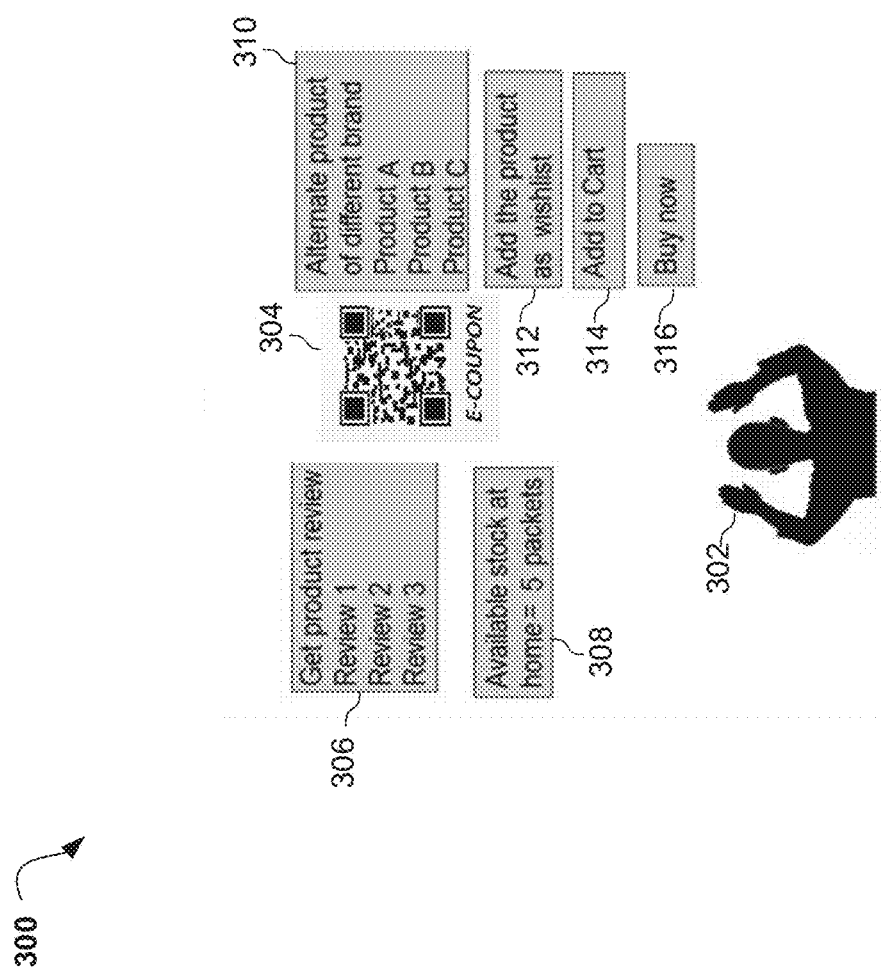

AI ENABLED COUPON CODE GENERATION FOR IMPROVED USER EXPERIENCE

BACKGROUND

The present invention relates generally to the field of computing, and more particularly to a system for generating an electronic coupon based on user preferences.

In a digital economy, companies are increasingly selling their products and services in an online environment, such as through a website and/or other shopping applications. This has led to mobile payment applications and other digital wallets expanding their services to allow users to seamlessly purchase goods and services, as well as pay bills, transfer money, book tickets, and/or perform other financial transactions. For performing any financial transaction involving the buying or selling of goods or services, companies are rewarding users with coupons which may be redeemed when making a future purchase, or transferred to a friend or family member. Often, these coupons have certain limitations and are only valid for a specified time period.

SUMMARY

According to one embodiment, a method, computer system, and computer program product for generating an electronic coupon based on user preferences is provided. The embodiment may include receiving real-time and historical data relating to one or more reward coupons. The embodiment may also include identifying a contextual situation of the user, and one or more preferences of the user regarding a coupon reward type based on the real-time and historical data. The embodiment may further include identifying one or more vendors that match with the one or more preferences of the user. The embodiment may also include generating one or more electronic coupons based on the contextual situation, the one or more preferences of the user, and the one or more identified vendors. The embodiment may further include presenting the one or more generated electronic coupons to the user. The embodiment may also include in response to determining the one or more generated electronic coupons match at least one preference of the user, adding the one or more generated electronic coupons that match the at least one preference of the user to an account of the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3 is a diagram depicting a digital overlay of the generated electronic coupon of FIGS. 2A and 2B and information about a product in an augmented reality (AR) environment according to at least one embodiment.

DETAILED DESCRIPTION

Figure 1:
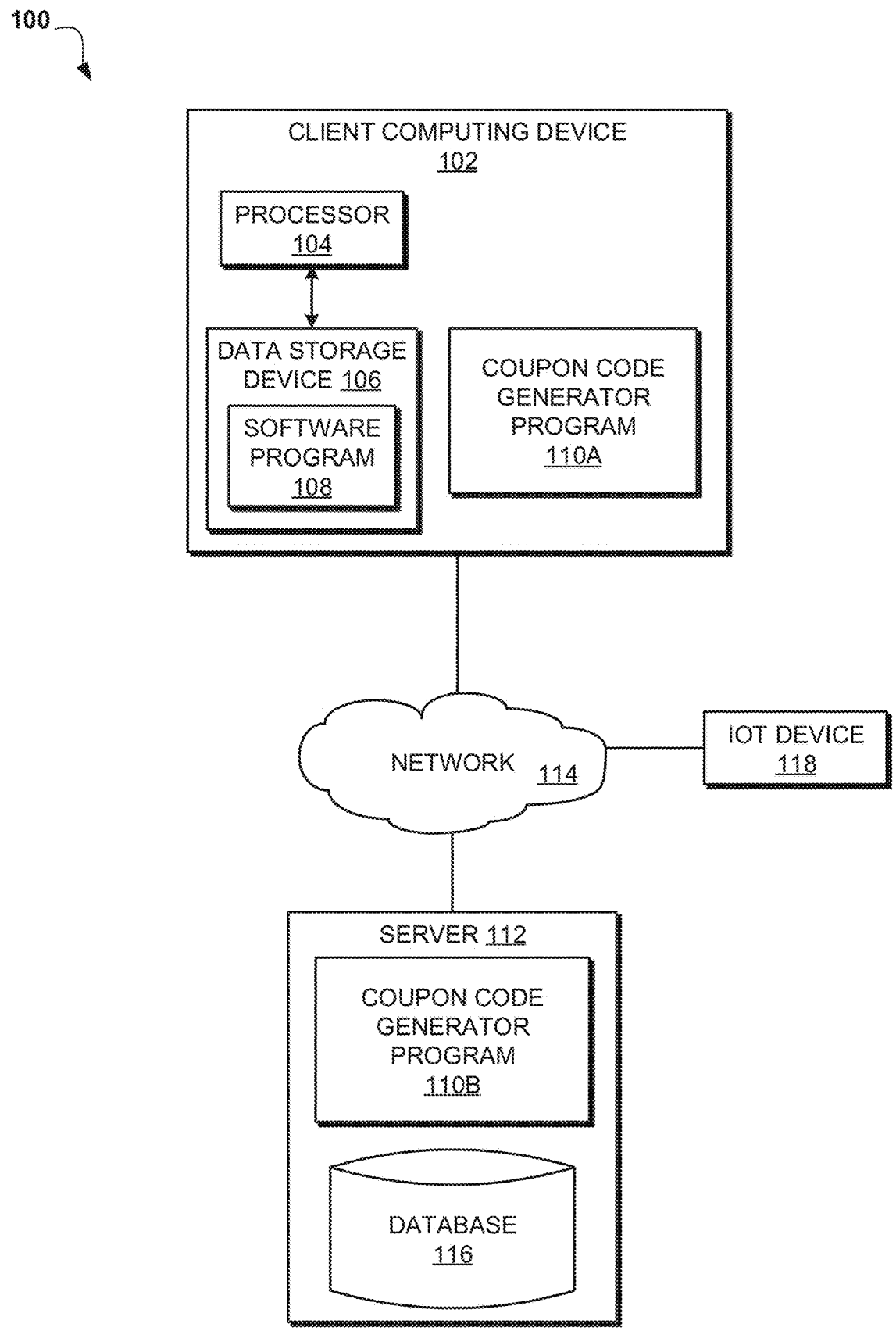
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for generating an electronic coupon based on user preferences. The following described exemplary embodiments provide a system, method, and program product to, among other things, generate an electronic coupon based on preferences of a user and, accordingly, present the generated coupon to the user. Therefore, the present embodiment has the capacity to improve the technical field of electronic coupon generation by leveraging artificial intelligence (AI) to understand the usage of a coupon by the user for a given context, thereby reducing the number of coupons presented to the user that go to waste.

As previously described, in a digital economy, companies are increasingly selling their products and services in an online environment, such as through a website and/or other shopping applications. This has led to mobile payment applications and other digital wallets expanding their services to allow users to seamlessly purchase goods and services, as well as pay bills, transfer money, book tickets, and/or perform other financial transactions. For performing any financial transaction involving the buying or selling of goods or services, companies are rewarding users with coupons which may be redeemed when making a future purchase, or transferred to a friend or family member. Often, these coupons have certain limitations and are only valid for a specified time period. When coupons are randomly sent to a user, the user may not be interested in the coupon, and thus choose not to use the coupon. For example, a user who utilizes a payment app to pay an electric bill may not be interested in a coupon for a video game. This problem is typically addressed by predicting the probability of coupon usage by the user at some time in the future. However, predicting the probability of coupon usage in the future fails to consider the preferences of the user. It may therefore be imperative to have a system in place to contextually understand the utilization of a coupon by a user so that electronic coupons presented to the user in the future meet the needs of the user. Thus, embodiments of the present invention may provide advantages including, but not limited to, utilizing AI to generate electronic coupons that are relevant to a user, automatically capturing the data necessary to generate relevant coupons, and utilizing blockchain to analyze coupon redemption and transfer details. The present invention does not require that all advantages need to be incorporated into every embodiment of the invention.

According to at least one embodiment, when a user is making an electronic payment over the internet, real-time and historical data relating to one or more reward coupons may be received. Upon receiving the real-time and historical data, a contextual situation of the user and one or more preferences of the user regarding a coupon reward type may be identified in order to identify one or more vendors that match with the one or more preferences of the user. One or more electronic coupons may then be generated based on the contextual situation, the one or more preferences of the user, and the one or more identified vendors. Upon generating the one or more electronic coupons, these electronic coupons may be presented to the user. In response to determining the one or more generated electronic coupons match at least one preference of the user, the one or more generated electronic coupons that match the at least one preference of the user may be added to an account of the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to generate an electronic coupon based on preferences of a user and, accordingly, present the generated coupon to the user.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a coupon code generator program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a coupon code generator program 110B and a database 116 and communicating with the client computing device 102 and IoT Device 118 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 includes an AR device, such as headsets, smart glasses, smart contact lenses and/or any other AR devices known in the art for enhancing the user's visual surroundings. IoT Device 118 may also include a smart band, a smart watch, an accelerometer, a location sensor, a camera and/or microphone embedded in or external to the AR device, and/or any other IoT Device 118 known in the art for capturing a location of the user that is capable of connecting to the communication network 114, and transmitting and receiving data with the client computing device 102 and the server 112.

According to the present embodiment, the coupon code generator program 110A, 110B may be a program capable of receiving real-time and historical data relating to a reward coupon, generating an electronic coupon based on the preferences of the user, presenting the generated electronic coupon to the user, utilizing AI to generate electronic coupons that are relevant to a user, automatically capturing the data necessary to generate relevant coupons, and utilizing blockchain to analyze coupon redemption and transfer details. The coupon code generation method is explained in further detail below with respect to FIGS. 2A and 2B.

Figure 2A:
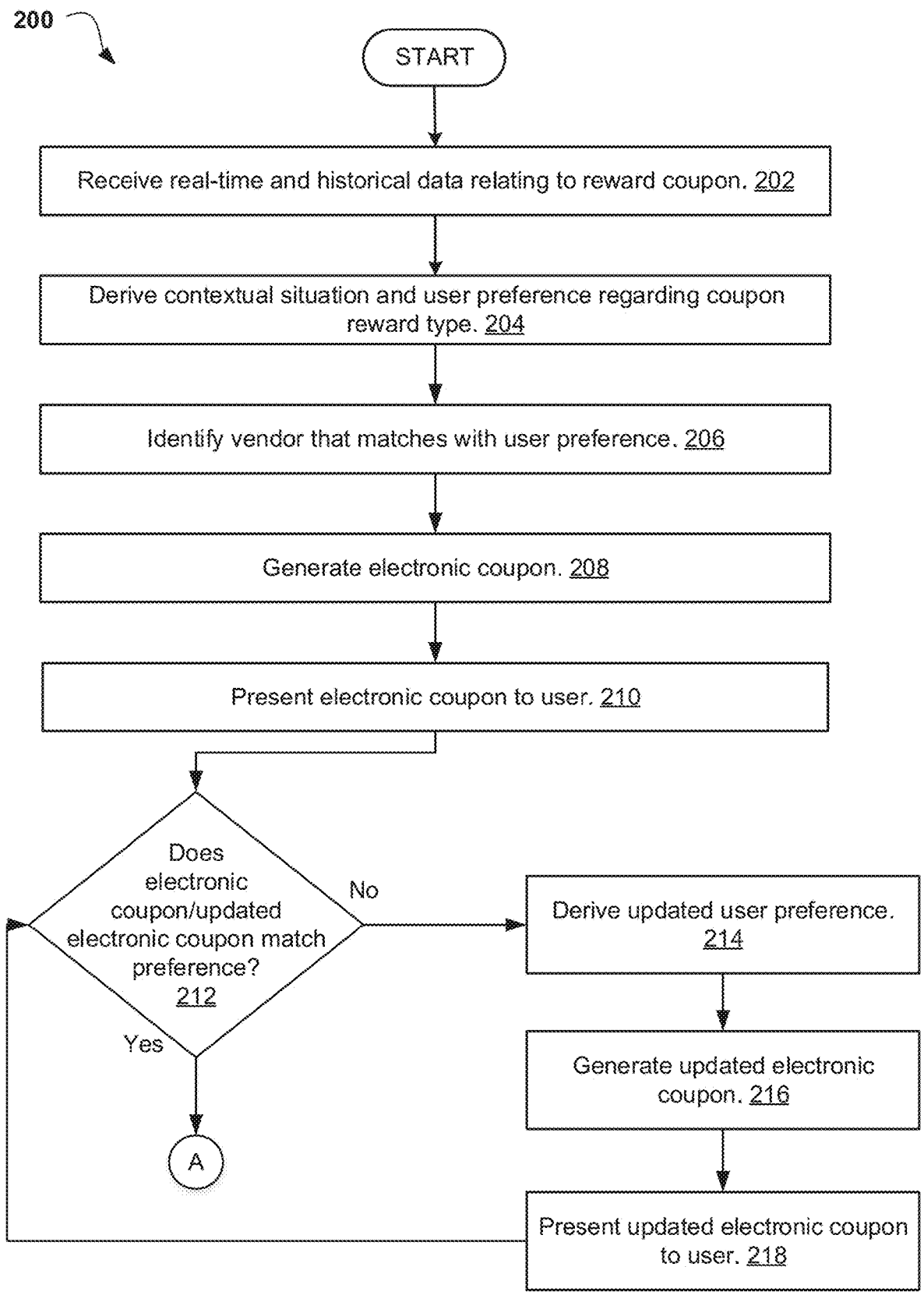
FIGS. 2A and 2B illustrate an operational flowchart for generating an electronic coupon based on user preferences in an electronic coupon generation process according to at least one embodiment.
Figure 2B:
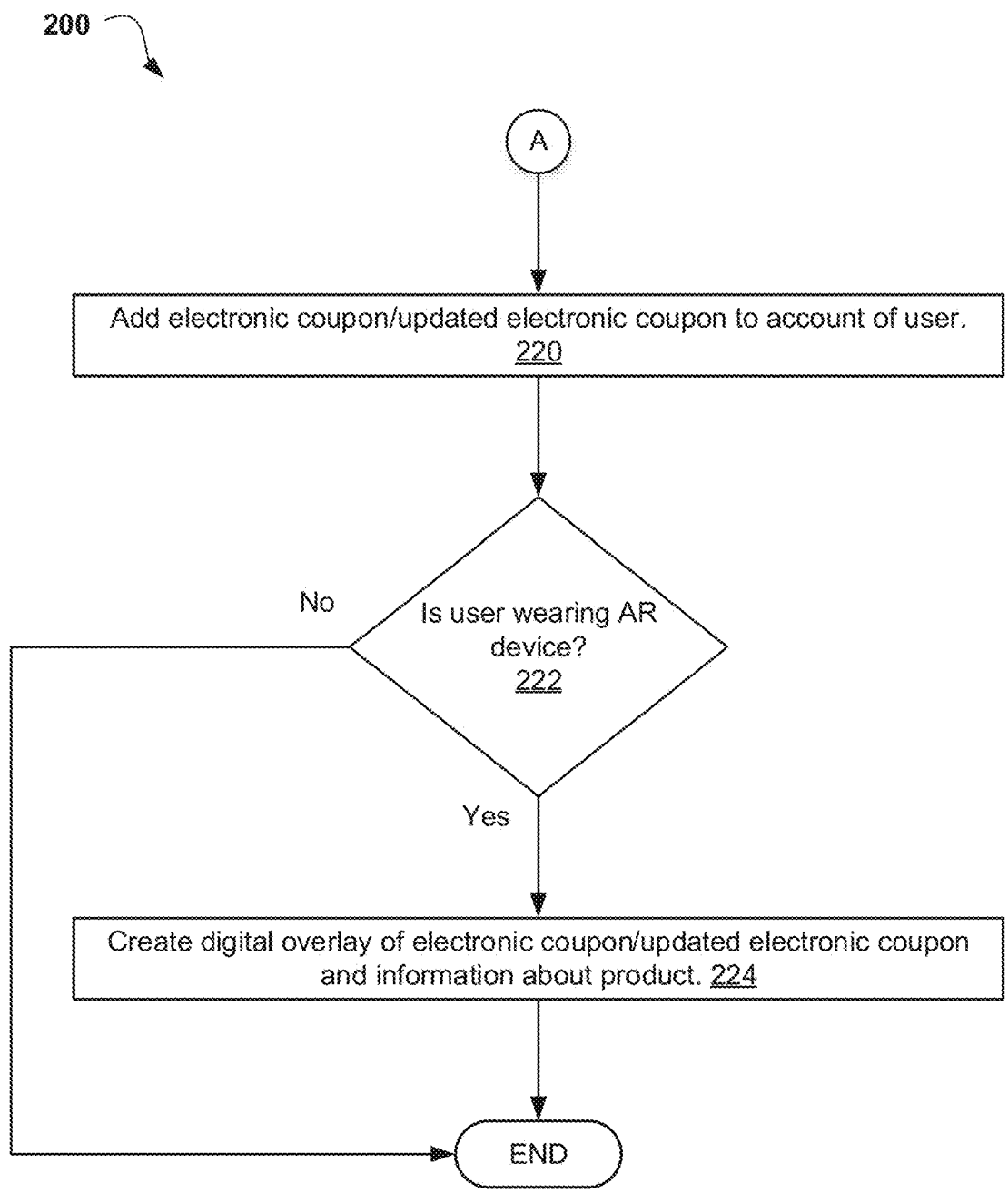

Referring now to FIGS. 2A and 2B, an operational flowchart for generating an electronic coupon based on user preferences in an electronic coupon generation process 200 is depicted according to at least one embodiment. At 202, the coupon code generator program 110A, 110B receives the real-time and historical data relating to the one or more reward coupons. Using the software program 108 on the client computing device 102, the real-time and historical data may be received. Examples of real-time and historical data include, but are not limited to, a type of reward coupon redeemed by the user (e.g., restaurant or movie coupon), a validity of the reward coupon (e.g., whether the coupon was still valid when redeemed), a time taken by the user to redeem the reward coupon (e.g., user redeemed coupon three days after receiving the coupon), a number of times the reward coupon was transferred to another user (e.g., more transfers indicate less interest in the reward coupon), and/or a type of reward coupon transferred (e.g., the user transferred a video game coupon). The real-time and historical data may be obtained from a blockchain, which is essentially a digital ledger of transactions. It may be appreciated that in some embodiments of the present invention, the last user to redeem the reward coupon and their contextual situation may also be obtained from the blockchain. In this manner, the other user may automatically receive coupons in the future that did not match with the preference of the user. As described above, this data may be received in real-time and may also be collected historically. For example, the coupon code generator program 110A, 110B may receive the number of times the reward coupon was transferred in the past (i.e., the historical data), and may also receive current data (i.e., the real-time data) on whether the reward coupon was transferred by the user to another user. The real-time and historical data may be used to identify one or more preferences of the user, described in further detail below with respect to step 204.

Then, at 204, the coupon code generator program 110A, 110B identifies the contextual situation of the user and the one or more preferences of the user regarding a coupon reward type. The one or more preferences of the user are identified based on the real-time and historical data. In the event there is no historical data, due to a user recently downloading a mobile payment application and using such payment application for the first time, the one or more preferences may be identified using the real-time data. For example, the user may download the mobile payment application and use it in a first purchase to pay for food from a restaurant. Thus, the coupon code generator program 110A, 110B may identify that the user prefers to receive restaurant coupons, and generate a restaurant coupon, described in further detail below with respect to steps 208 and 216.

Continuing the example above, if the user redeems the restaurant coupon, this may reinforce the identification that the user likes receiving restaurant coupons and the redemption details may be stored as historical data. However, if the user transfers the restaurant coupon to another user or lets the restaurant coupon expire, this may indicate that the user is not interested in receiving restaurant coupons in the future, and the information on whom the coupon was transferred to or when it expired may also be stored as historical data.

The contextual situation may be identified via a polling mechanism where the coupon code generator program 110A, 110B polls a newsfeed in a particular geographic location. For example, the newsfeed may include information about the happenings in a city such as, but not limited to, a new restaurant, a new movie release, a new retail shopping center, and/or information about business closures. Continuing the example, the user may love a restaurant for which they receive and redeem a reward coupon often. However, due to a gas leak in the area, the restaurant may be required to close for a few days due to public safety concerns. Thus, the reward coupon may expire before the restaurant is able to reopen, in which case the coupon would go to waste. In considering the contextual situation, the coupon code generator program 110A, 110B may send a different reward coupon that is consistent with the happenings in the city.

Next, at 206, the coupon code generator program 110A, 110B identifies the one or more vendors that match with the one or more preferences of the user. As used herein, "vendor" means any business offering goods and/or services for sale. For example, a vendor may be a retailer offering goods for sale. As another example, the vendor may be a car wash offering services for sale. Continuing the example, the user may redeem a carwash coupon within one week of receiving the coupon. Thus, the coupon code generator program 110A, 110B may identify vendors in the geographic area of the user that offer car wash services. According to at least one embodiment, the vendor may be an established business which already offers reward coupons to customers, in which case reward coupons for those vendors may be generated freely. According to at least one other embodiment, the vendor may be a new business that does not yet grant reward coupons, in which case the coupon code generator program 110A, 110B may assist an aggregator to onboard these new businesses. In this manner, more reward coupons may be generated for the user.

Then, at 208, the coupon code generator program 110A, 110B generates the one or more electronic coupons. The one or more electronic coupons are generated based on the contextual situation, the one or more preferences of the user, and the one or more identified vendors. For maximum security, the one or more electronic coupons may be generated using an anti-pattern, making it difficult for hackers to guess the pattern of these electronic coupons.

As described above, the one or more electronic coupons are generated in consideration of the contextual situation. For example, the user may often redeem electronic coupons for pizzerias, but if a gas leak in a city is causing a closure of most or all of the pizzerias in the city, the electronic coupon may not be generated. As another example, on ongoing construction project may make it difficult to reach an Italian restaurant by mass transit. Thus, during the duration of the construction project, electronic coupons for that Italian restaurant may not be generated.

As described above, the one or more electronic coupons are generated in consideration of the one or more preferences of the user. For example, if the user redeems a video game coupon, this may reinforce the identification that the user likes receiving video game coupons, and thus electronic coupons for video games may be generated. However, if the user transfers the video game coupon to another user or lets the video game coupon expire, this may indicate that the user is not interested in receiving video game coupons in the future, and thus electronic coupons for video games may not be generated.

Similarly, the one or more electronic coupons are generated in consideration of the vendors identified in an area. For example, the user may prefer to receive car wash coupons, but if the user lives in or visits an area where there are no car washes, an electronic car wash coupon may not be generated. On the other hand, if the user prefers coupons for clothing retailers and there is a plethora of clothing retailers in an area, the electronic coupons for clothing retailers may continue to be generated.

Then, at 210, the coupon code generator program 110A, 110B presents the one or more generated electronic coupons to the user. According to at least one embodiment, the one or more electronic coupons may be presented to the user via text message to a mobile device of the user, via an email to the user, and/or via a mobile payment application. According to at least one other embodiment, the one or more generated electronic coupons may be presented to the user via an AR device, described in further detail below with respect to step 224. Upon presenting the one or more generated electronic coupons to the user, it may then be determined whether the one or more generated electronic coupons match at least one of the one or more preferences of the user, described in further detail below with respect to step 212.

Next, at 212, the coupon code generator program 110A, 110B determines whether the one or more generated electronic coupons match at least one of the one or more preferences of the user. According to at least one embodiment, the determination may be made via personality insights matching using a Multi-Armed Bandit (MAB) model (i.e., an AI enabled engine) and cosine similarity. The real-time and historical data may be ingested by the MAB model to derive the user's preference regarding the coupon reward type. For example, more days taken to use the reward coupon may indicate a lack of interest in the reward coupon. Similarly, if the reward coupon is presented to the user, the user allowing the coupon to expire may also indicate a lack of interest in the reward coupon. Thus, it is apparent that user preferences may change since a first purchase (e.g., a first purchase of an item using a mobile payment application) or over time. For example, the user may make a one time utility bill payment through a mobile payment application, and in the future use the mobile payment application to buy food at a restaurant. Based on the real-time and historical data, when the user buys food in the future, the user may receive a reward coupon for a utility bill payment, but may actually prefer a reward coupon for a restaurant. Thus, the reward coupon may expire or the user may transfer the reward coupon to a friend or family member. In such an instance, the MAB model may output a −x reward function such that the data from the current transaction (i.e., the food purchase) may be fed back into the MAB model in order to derive an updated user preference. Contrarily, when the user buys food in the future, the user may receive the reward coupon for the utility bill payment and redeem the coupon themselves within a few days. In such an instance, the MAB model may output a +x reward function such that the data from the current transaction (i.e., the food purchase) may be fed back into the MAB model in order to reinforce the preference of the user.

According to at least one other embodiment, the user may manually provide feedback to the coupon code generator program 110A, 110B regarding their preference for a coupon reward type. For example, when the user is presented with the one or more generated electronic coupons described above with respect to step 210, the user may be given an option to accept or reject the reward coupon outright. Accepting the reward coupon may have the effect of the +x reward function, whereas rejecting the reward coupon may have the effect of the −x reward function.

In response to determining the one or more generated electronic coupons match at least one of the one or more preferences of the user (step 212, "Yes" branch), the electronic coupon generation process 200 proceeds to step 220 to add the one or more generated electronic coupons that match the at least one preference of the user to an account of the user. In response to determining the one or more generated electronic coupons do not match at least one of the one or more preferences of the user (step 212, "No" branch), the electronic coupon generation process 200 proceeds to step 214 to derive an updated preference of the user.

Then, at 214, the coupon code generator program 110A, 110B derives the updated preference based on the real-time data. According to at least one embodiment, the updated preference may be derived from the most recent purchase transaction. Continuing the example above, if the most recent purchase is for food from a restaurant, the updated preference may be that the user prefers restaurant coupons. According to at least one other embodiment, the user may manually update their preferences from a list of preferences and/or a dialog box on their mobile device or laptop. According to at least one further embodiment, the updated preference may include removing a previous preference for a coupon reward type. For example, the user may specify that if any presented electronic coupon is not redeemed by the user within a specified time period (e.g., within 90 days), then the coupon reward type for that coupon should be removed from their preferences. Continuing the example, if the user does not use a restaurant coupon within 90 days, it may be determined that the user is no longer interested in receiving restaurant coupons.

Next, at 216, the coupon code generator program 110A, 110B generates an updated electronic coupon based on the updated preference. The updated electronic coupon may be generated in a similar manner to generating the one or more electronic coupons described above with respect to step 208. For maximum security, the updated electronic coupon may also be generated using an anti-pattern, making it difficult for hackers to guess the pattern of the updated electronic coupon.

Then, at 218, the coupon code generator program 110A, 110B presents the updated electronic coupon to the user. The updated electronic coupon may be presented to the user in a similar manner to presenting the one or more generated electronic coupons to the user described above with respect to step 210. Upon presenting the updated electronic coupon to the user, the electronic coupon generation process 200 reverts back to step 212 to determine whether the updated electronic coupon matches at least one of the one or more preferences of the user, where the one or more preferences include the updated preference. In response to determining the updated electronic coupon matches at least one of the one or more preferences of the user (step 212, "Yes" branch), the electronic coupon generation process 200 proceeds to step 220 to add the updated electronic coupon to the account of the user. In response to determining the updated electronic coupon does not match at least one of the one or more preferences of the user (step 212, "No" branch), the electronic coupon generation process 200 proceeds back to step 214 to derive an updated preference of the user. Thus, the electronic coupon generation process 200 is an iterative process which may update the one or more preferences of the user dynamically and in real-time.

Next, at 220, the coupon code generator program 110A, 110B adds the one or more generated electronic coupons that match the at least one preference of the user to the account of the user. If generated, the updated electronic coupon may also be added to the account of the user. The account may be any online account including, but not limited to, an account for a website, an account for a mobile payment application, and/or a digital wallet. Once the one or more generated electronic coupons, and the updated electronic coupon, if generated, are added to the account of the user, these coupons may be redeemed by the user prior to any expiration date and subject to any other vendor restrictions.

Then, at 222, the coupon code generator program 110A, 110B determines whether the user is wearing the AR device. As described above, the AR device may be a headset, smart glasses, smart contact lenses and/or any other AR devices known in the art for enhancing the user's visual surroundings. IoT Device 118 may also include a smart band, a smart watch, an accelerometer, a location sensor, a camera and/or microphone embedded in or external to the AR device, and/or any other IoT Device 118 known in the art for capturing a location of the user. In response to determining the user is wearing the AR device (step 222, "Yes" branch), the electronic coupon generation process 200 proceeds to step 224 to create a digital overlay of the one or more generated electronic coupons, and the updated electronic coupon, if generated, and create a digital overlay of information relating to a product for which the one or more generated electronic coupons and the updated electronic coupon can be redeemed. In response to determining the user is not wearing the AR device (step 222, "No" branch), the electronic coupon generation process 200 ends.

Next, at 224, the coupon code generator program 110A, 110B creates a digital overlay of the one or more generated electronic coupons, and the updated electronic coupon, if generated, and creates a digital overlay of information relating to a product for which the one or more generated electronic coupons and the updated electronic coupon can be redeemed. The digital overlay of the one or more generated electronic coupons and the updated electronic coupon, and the digital overlay of information relating to the product are described in further detail below with respect to FIG. 3. According to at least one embodiment, the coupon code generator program 110A, 110B may sync with a calendar of the one or more identified vendors. For example, if the generated electronic coupon is a discount coupon for clothing from a retailer, the coupon code generator program 110A, 110B may search the calendar for any upcoming sales from that retailer. If there is an upcoming sale, the user may be notified as to whether the generated electronic coupon may be used in combination with the sale for a maximum discount.

Referring now to FIG. 3, a diagram 300 depicting a digital overlay of the generated electronic coupon of FIGS. 2A and 2B and information about a product for which the generated electronic coupon may be redeemed in an augmented reality (AR) environment is shown according to at least one embodiment. The user 302 may be wearing an AR device. As illustrated in the diagram 300, the digital overlay of the generated electronic coupon 304 may be displayed in the center of the field of view of the AR device. According to at least one embodiment, information about the product for which the generated electronic coupon 304 may be redeemed is displayed around the digital overly of the generated electronic coupon 304 for an enhanced shopping experience. For example, product reviews 306 may be displayed in the top left corner of the field of view. Available stock 308 may be displayed at the bottom left corner. Alternative products 310 may be displayed at the top right corner. Additionally, action buttons relating to purchasing the product may also be displayed in the field of view. For example, Add the product as wish list 312, Add to cart 314, and Buy now 316 may be arranged toward the bottom right corner. The examples described above are not intended to be limiting and it may be appreciated that additional or alternative information may be displayed to the user 302 in the field of view of the AR device.

It may be appreciated that FIGS. 2A, 2B, and 3 provide only an illustration of one implementation and do not imply any limitations with regard to how different embodiments may be implemented. Many modifications to the depicted environments may be made based on design and implementation requirements.

Figure 4:
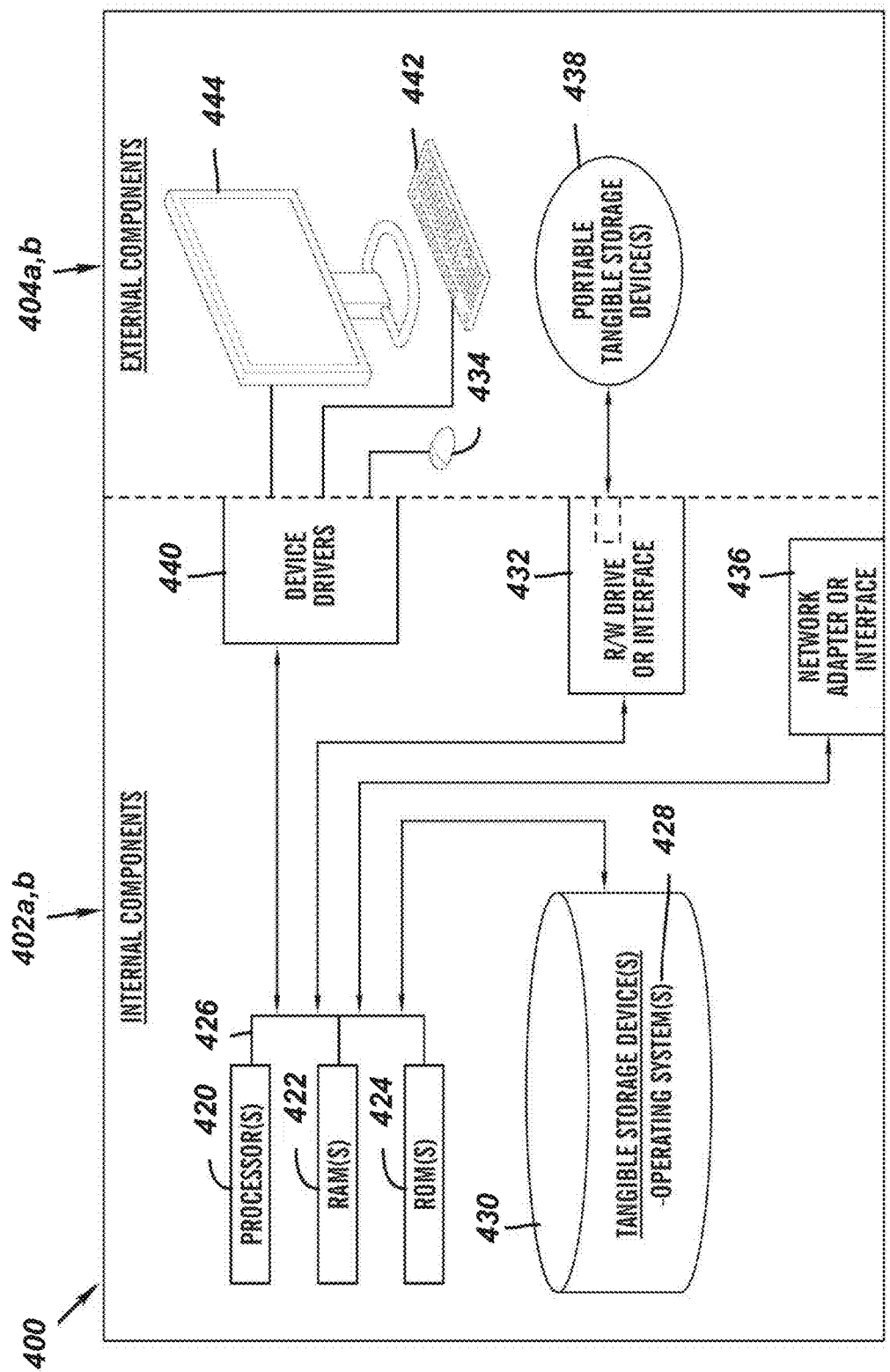
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the coupon code generator program 110A in the client computing device 102 and the coupon code generator program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the coupon code generator program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the coupon code generator program 110A in the client computing device 102 and the coupon code generator program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the coupon code generator program 110A in the client computing device 102 and the coupon code generator program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
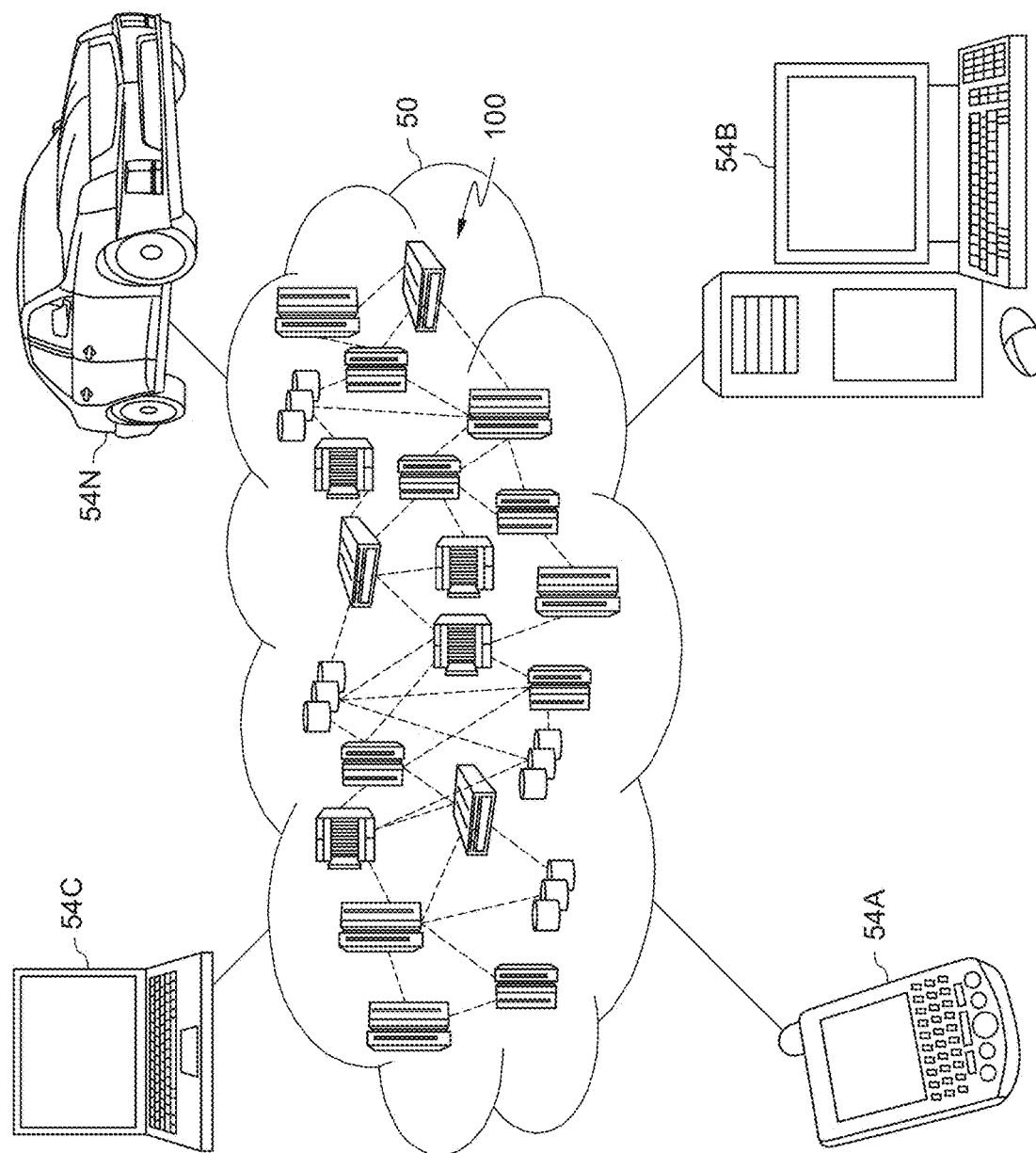
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
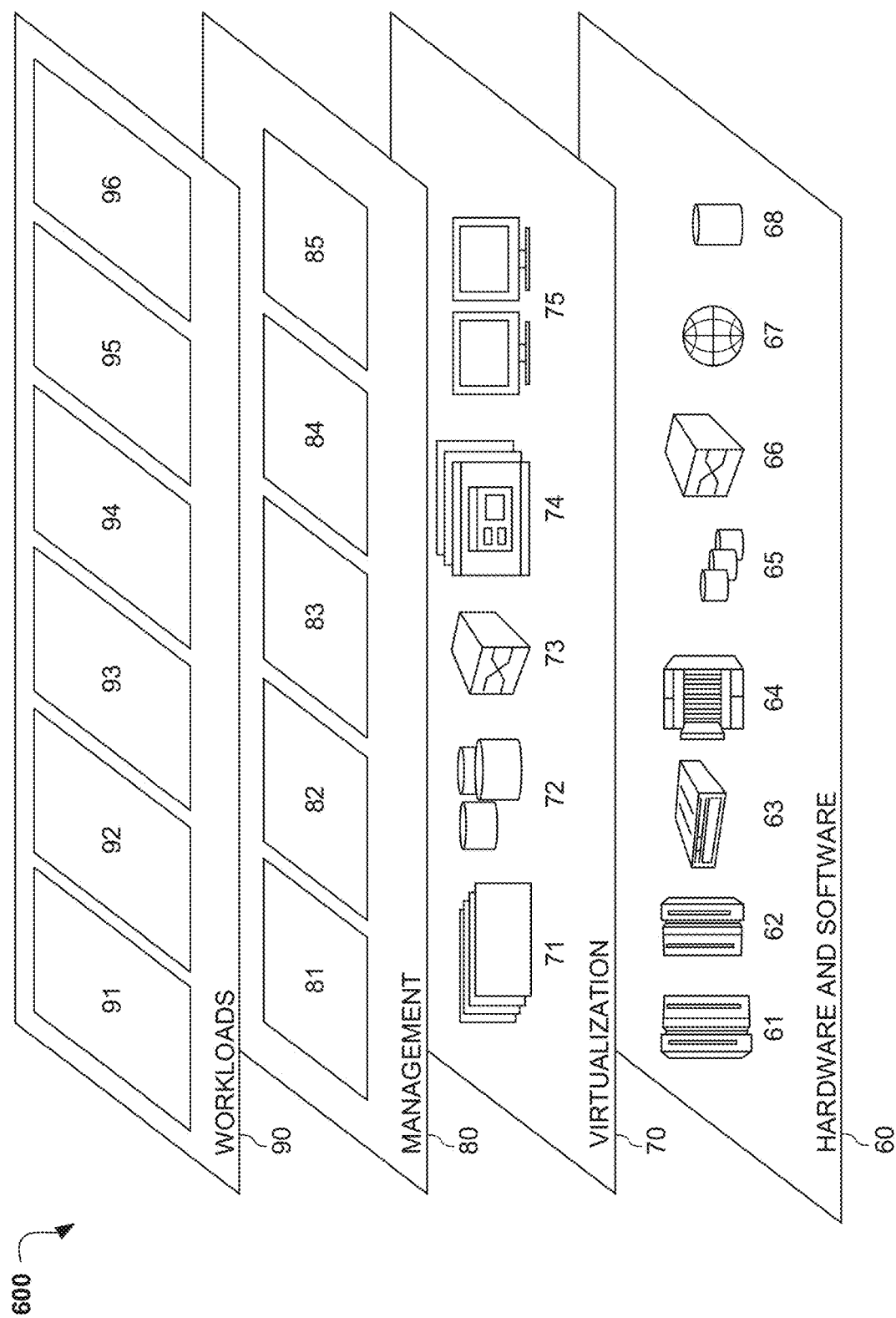
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating an electronic coupon based on user preferences 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of generating an electronic coupon based on preferences of a user, the method comprising:
   receiving real-time and historical data relating to one or more reward coupons;
   identifying a contextual situation of a user and one or more preferences of the user regarding a coupon reward type, wherein the contextual situation includes information about business closures within a geographical area of the user;
   identifying one or more vendors that match with the one or more preferences of the user;
   generating, for at least one vendor that is determined to be open for business, one or more electronic coupons based on the contextual situation, the one or more preferences of the user, and the one or more identified vendors;
   presenting the one or more generated electronic coupons to the user;
   determining whether the one or more generated electronic coupons match at least one of the one or more preferences of the user;
   in response to determining the one or more generated electronic coupons match at least one of the one or more preferences of the user; adding the one or more generated electronic coupons that match the at least one preference of the user to an account of the user;
   creating a digital image overlay of the one or more generated electronic coupons and a digital overlay of information relating to a product for which the one or more generated electronic coupons and the updated electronic coupon can be redeemed; and
   displaying, by an AR device of the user, the digital image overlay of the one or more generated electronic coupons in a center of a field of view of the AR device and the information relating to the product around the one or more generated electronic coupons, wherein the information includes a plurality of action buttons configured to allow the user to purchase the product.

2. The method of claim 1, further comprising:
   in response to determining the one or more generated electronic coupons do not match at least one preference of the user, deriving an updated preference based on the real-time data;
   generating an updated electronic coupon based on the updated preference;
   presenting the updated electronic coupon to the user; and
   in response to determining the updated electronic coupon matches at least one of the one or more preferences of the user, adding the updated electronic coupon to the account of the user.

3. The method of claim 2, wherein an anti-pattern is used to generate the one or more electronic coupons and the updated electronic coupon, if generated.

4. The method of claim 2, wherein the contextual situation is identified by polling a newsfeed in a geographic location.

5. The method of claim 2, wherein the real-time and historical data include at least:
   a type of reward coupon redeemed by the user;
   a validity of the reward coupon;
   a time taken by the user to redeem the reward coupon; and
   a number of times the reward coupon was transferred to another user.

6. The method of claim 5, wherein a blockchain is utilized to obtain the real-time and historical data.

7. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving real-time and historical data relating to one or more reward coupons;
   identifying a contextual situation of a user and one or more preferences of the user regarding a coupon reward type, wherein the contextual situation includes information about business closures within a geographical area of the user;
   identifying one or more vendors that match with the one or more preferences of the user;
   generating, for at least one vendor that is determined to be open for business, one or more electronic coupons based on the contextual situation, the one or more preferences of the user, and the one or more identified vendors;
   presenting the one or more generated electronic coupons to the user;
   determining whether the one or more generated electronic coupons match at least one of the one or more preferences of the user;
   in response to determining the one or more generated electronic coupons match at least one of the one or more preferences of the user; adding the one or more generated electronic coupons that match the at least one preference of the user to an account of the user;

creating a digital image overlay of the one or more generated electronic coupons and a digital overlay of information relating to a product for which the one or more generated electronic coupons and the updated electronic coupon can be redeemed; and displaying, by an AR device of the user, the digital image overlay of the one or more generated electronic coupons in a center of a field of view of the AR device and the information relating to the product around the one or more generated electronic coupons, wherein the information includes a plurality of action buttons configured to allow the user to purchase the product.

8. The computer system of claim 7, further comprising:

in response to determining the one or more generated electronic coupons do not match at least one preference of the user, deriving an updated preference based on the real-time data;

generating an updated electronic coupon based on the updated preference;

presenting the updated electronic coupon to the user; and in response to determining the updated electronic coupon matches at least one of the one or more preferences of the user, adding the updated electronic coupon to the account of the user.

9. The computer system of claim 8, wherein an anti-pattern is used to generate the one or more electronic coupons and the updated electronic coupon, if generated.

10. The computer system of claim 8, wherein the contextual situation is identified by polling a newsfeed in a geographic location.

11. The computer system of claim 8, wherein the real-time and historical data include at least:

a type of reward coupon redeemed by the user;

a validity of the reward coupon;

a time taken by the user to redeem the reward coupon; and a number of times the reward coupon was transferred to another user.

12. The computer system of claim 11, wherein a blockchain is utilized to obtain the real-time and historical data.

13. A computer program product, the computer program product comprising:

one or more computer-readable tangible storage medium and program instructions stored on at least one of the one or more tangible storage medium, the program instructions executable by a processor capable of performing a method, the method comprising:

receiving real-time and historical data relating to one or more reward coupons;

identifying a contextual situation of a user and one or more preferences of the user regarding a coupon reward type, wherein the contextual situation includes information about business closures within a geographical area of the user;

identifying one or more vendors that match with the one or more preferences of the user;

generating, for at least one vendor that is determined to be open for business, one or more electronic coupons based on the contextual situation, the one or more preferences of the user, and the one or more identified vendors;

presenting the one or more generated electronic coupons to the user;

determining whether the one or more generated electronic coupons match at least one of the one or more preferences of the user;

in response to determining the one or more generated electronic coupons match at least one of the one or more preferences of the user, adding the one or more generated electronic coupons that match the at least one preference of the user to an account of the user;

creating a digital image overlay of the one or more generated electronic coupons and a digital overlay of information relating to a product for which the one or more generated electronic coupons and the updated electronic coupon can be redeemed; and displaying, by an AR device of the user, the digital image overlay of the one or more generated electronic coupons in a center of a field of view of the AR device and the information relating to the product around the one or more generated electronic coupons, wherein the information includes a plurality of action buttons configured to allow the user to purchase the product.

14. The computer program product of claim 13, further comprising:

in response to determining the one or more generated electronic coupons do not match at least one preference of the user, deriving an updated preference based on the real-time data;

generating an updated electronic coupon based on the updated preference;

presenting the updated electronic coupon to the user; and in response to determining the updated electronic coupon matches at least one of the one or more preferences of the user, adding the updated electronic coupon to the account of the user.

15. The computer program product of claim 14, wherein an anti-pattern is used to generate the one or more electronic coupons and the updated electronic coupon, if generated.

16. The computer program product of claim 14, wherein the contextual situation is identified by polling a newsfeed in a geographic location.

17. The computer program product of claim 14, wherein the real-time and historical data include at least:

a type of reward coupon redeemed by the user;

a validity of the reward coupon;

a time taken by the user to redeem the reward coupon; and a number of times the reward coupon was transferred to another user.

* * * * *